US008994674B2

(12) United States Patent
Eguchi et al.

(10) Patent No.: US 8,994,674 B2
(45) Date of Patent: Mar. 31, 2015

(54) INFORMATION VIEWING APPARATUS, CONTROL PROGRAM AND CONTROLLING METHOD

(75) Inventors: Tatsuya Eguchi, Toyohashi (JP); Tetsuhiro Shibata, Sagamihara (JP); Tsutomu Suka, Fussa (JP); Keiichiro Hyodo, Kokubunji (JP); Masayuki Inoue, Hachioji (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 89 days.

(21) Appl. No.: 13/495,414

(22) Filed: Jun. 13, 2012

(65) Prior Publication Data

US 2012/0319971 A1   Dec. 20, 2012

(30) Foreign Application Priority Data

Jun. 17, 2011   (JP) ................................ 2011-135583

(51) Int. Cl.
*G06F 3/041* (2006.01)
*G06F 3/0488* (2013.01)

(52) U.S. Cl.
CPC .................................. *G06F 3/04883* (2013.01)
USPC ........................................................ 345/173

(58) Field of Classification Search
CPC ......................................................... G06F 3/48
USPC ................................................. 345/156, 173
See application file for complete search history.

(56) References Cited

U.S. PATENT DOCUMENTS

| | | | | |
|---|---|---|---|---|
| 5,757,368 A | * | 5/1998 | Gerpheide et al. ............. | 715/769 |
| 5,825,352 A | * | 10/1998 | Bisset et al. ................... | 345/173 |
| 5,914,718 A | * | 6/1999 | Chiu et al. ..................... | 715/863 |
| 6,061,051 A | * | 5/2000 | Chan et al. ..................... | 345/173 |
| 6,181,344 B1 | * | 1/2001 | Tarpenning et al. .......... | 715/863 |
| 7,158,123 B2 | * | 1/2007 | Myers et al. ................... | 345/173 |
| 7,386,801 B1 | * | 6/2008 | Horvitz et al. ................ | 715/764 |
| 8,209,628 B1 | * | 6/2012 | Davidson ....................... | 715/790 |
| 8,225,224 B1 | * | 7/2012 | Robertson et al. ............. | 715/767 |

(Continued)

FOREIGN PATENT DOCUMENTS

| | | |
|---|---|---|
| JP | 2000-10733 A | 1/2000 |
| JP | 2003-280812 A | 10/2003 |

(Continued)

*Primary Examiner* — Temesgh Ghebretinsae
*Assistant Examiner* — Michael J Jansen, II
(74) *Attorney, Agent, or Firm* — Buchanan Ingersoll & Rooney PC

(57) ABSTRACT

Disclosed is an information viewing apparatus, which makes it possible for the user to conduct operations for inputting information and establishing various kinds of functions only by conducting consecutive simplified operations from a multi-touchable touch panel. The apparatus includes a display section provided with a multi-touchable touch panel having first and second touch panels, and a control section that controls the display section. In a state that the display section is displaying a document, when detecting a predetermined dragging action, the control section makes the display section displays an inputting screen, which allows the user to conduct an inputting operation from the second touch panel, during a time when a touching status is maintained in such a manner that the inputting screen overlaps the document. When the touching status is released, the control section controls the display section so as to make the inputting screen evacuate from the document.

21 Claims, 11 Drawing Sheets

(56) References Cited

U.S. PATENT DOCUMENTS

| | | | |
|---|---|---|---|
| 8,237,664 B2 * | 8/2012 | Swanbufg et al. | 345/173 |
| 8,386,949 B2 * | 2/2013 | Baek et al. | 715/769 |
| 8,527,879 B2 * | 9/2013 | Symons et al. | 715/723 |
| 8,542,198 B2 * | 9/2013 | Kumor | 345/173 |
| 8,564,544 B2 * | 10/2013 | Jobs et al. | 345/173 |
| 8,904,291 B2 * | 12/2014 | Kim | 715/748 |
| 2004/0150668 A1 * | 8/2004 | Myers et al. | 345/771 |
| 2004/0165010 A1 * | 8/2004 | Robertson et al. | 345/805 |
| 2006/0001650 A1 * | 1/2006 | Robbins et al. | 345/173 |
| 2006/0250372 A1 * | 11/2006 | Lii | 345/173 |
| 2007/0002027 A1 * | 1/2007 | Lii et al. | 345/173 |
| 2007/0097150 A1 * | 5/2007 | Ivashin et al. | 345/660 |
| 2007/0101292 A1 * | 5/2007 | Kupka | 715/810 |
| 2007/0188473 A1 * | 8/2007 | Anwar | 345/173 |
| 2008/0042978 A1 * | 2/2008 | Perez-Noguera | 345/168 |
| 2009/0024956 A1 * | 1/2009 | Kobayashi | 715/784 |
| 2009/0119615 A1 * | 5/2009 | Huang | 715/786 |
| 2009/0174679 A1 * | 7/2009 | Westerman | 345/173 |
| 2009/0210810 A1 * | 8/2009 | Ryu et al. | 715/769 |
| 2009/0228842 A1 * | 9/2009 | Westerman et al. | 715/863 |
| 2009/0282332 A1 * | 11/2009 | Porat | 715/702 |
| 2009/0296988 A1 | 12/2009 | Yamazaki et al. | |
| 2009/0307589 A1 | 12/2009 | Inose et al. | |
| 2009/0320070 A1 * | 12/2009 | Inoguchi | 725/40 |
| 2010/0088634 A1 * | 4/2010 | Tsuruta et al. | 715/800 |
| 2010/0131880 A1 * | 5/2010 | Lee et al. | 715/769 |
| 2010/0245242 A1 * | 9/2010 | Wu et al. | 345/157 |
| 2010/0299638 A1 * | 11/2010 | Choi | 715/835 |
| 2010/0302172 A1 * | 12/2010 | Wilairat | 345/173 |
| 2010/0306705 A1 * | 12/2010 | Nilsson | 715/835 |
| 2011/0018827 A1 * | 1/2011 | Wang et al. | 345/173 |
| 2011/0043458 A1 * | 2/2011 | Kumor | 345/173 |
| 2011/0061021 A1 * | 3/2011 | Kang et al. | 715/800 |
| 2011/0074713 A1 * | 3/2011 | Yamada et al. | 345/173 |
| 2011/0099513 A1 * | 4/2011 | Ameline | 715/790 |
| 2011/0128244 A1 * | 6/2011 | Cho et al. | 345/173 |
| 2011/0134047 A1 * | 6/2011 | Wigdor et al. | 345/173 |
| 2011/0134049 A1 * | 6/2011 | Lin et al. | 345/173 |
| 2011/0161852 A1 * | 6/2011 | Vainio et al. | 715/769 |
| 2011/0202837 A1 * | 8/2011 | Fong et al. | 715/702 |
| 2011/0209099 A1 * | 8/2011 | Hinckley et al. | 715/863 |
| 2011/0234522 A1 * | 9/2011 | Lin et al. | 345/173 |
| 2011/0279396 A1 | 11/2011 | Wakai et al. | |
| 2012/0030624 A1 * | 2/2012 | Migos | 715/830 |
| 2012/0054671 A1 * | 3/2012 | Thompson et al. | 715/784 |
| 2012/0210201 A1 * | 8/2012 | Kim et al. | 715/202 |
| 2012/0254790 A1 * | 10/2012 | Colombino et al. | 715/781 |
| 2012/0254808 A1 * | 10/2012 | Gildfind | 715/863 |
| 2012/0284427 A1 * | 11/2012 | Dods et al. | 710/3 |
| 2012/0299968 A1 * | 11/2012 | Wong et al. | 345/661 |
| 2012/0304092 A1 * | 11/2012 | Jarrett et al. | 715/765 |
| 2012/0319971 A1 * | 12/2012 | Eguchi et al. | 345/173 |
| 2013/0298054 A1 * | 11/2013 | Nakazawa et al. | 715/765 |

FOREIGN PATENT DOCUMENTS

| | | |
|---|---|---|
| JP | 2007-279638 A | 10/2007 |
| JP | 2009-288881 A | 12/2009 |
| JP | 2009-294857 A | 12/2009 |
| JP | 2011-14170 A | 1/2011 |

* cited by examiner

FIG. 6a — EVEN WHEN DRAGGING ACTION IS STARTED FROM UPPER AREA, MEMO COLUMN IS SETTLED AT RIGHT SIDE OF FINGER

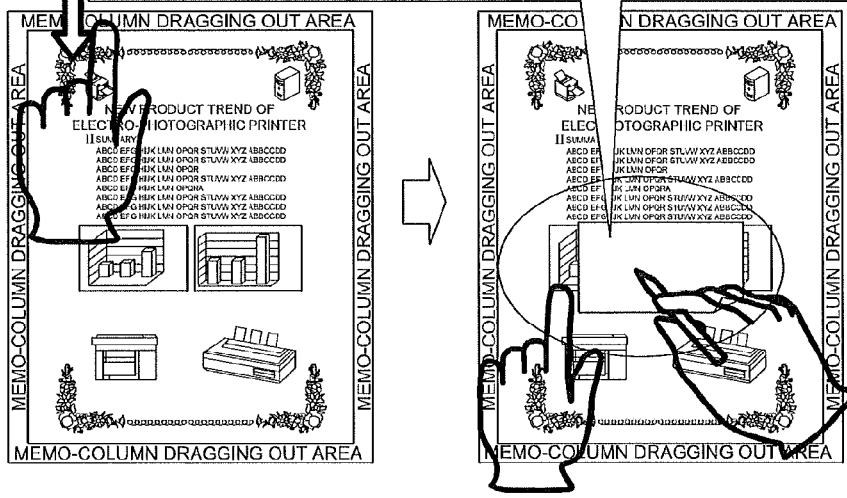

FIG. 6b — WHEN DRAGGING ACTION IS STARTED FROM RIGHT AREA, MEMO COLUMN IS SETTLED AT RIGHT SIDE OF FINGER

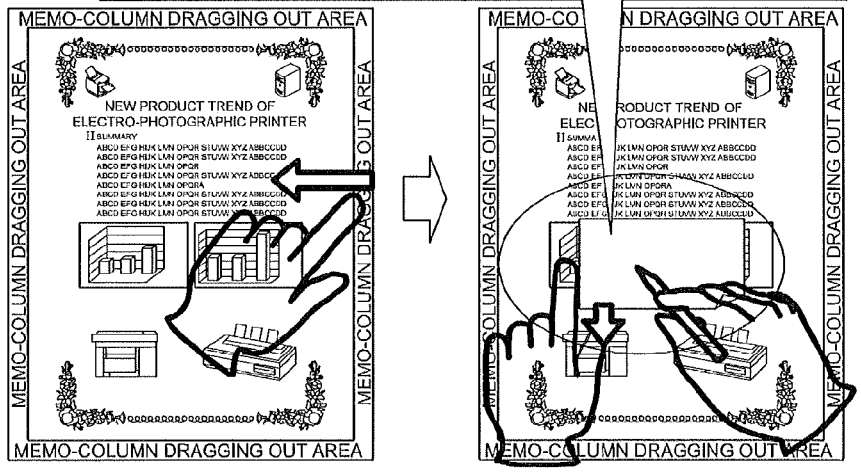

EVEN WHEN DRAGGING ACTION IS STARTED FROM LEFT AREA, MEMO COLUMN IS SETTLED AT RIGHT SIDE OF FINGER, SINCE APPARATUS RECOGNIZES THAT USER'S DOMINANT HAND IS RIGHT HAND, AS A RESULT OF ID DETECTING OPERATION, AND ASSUMES THAT USER WILL HANDWRITE MEMO WITH HIS RIGHT HAND

FIG. 6c

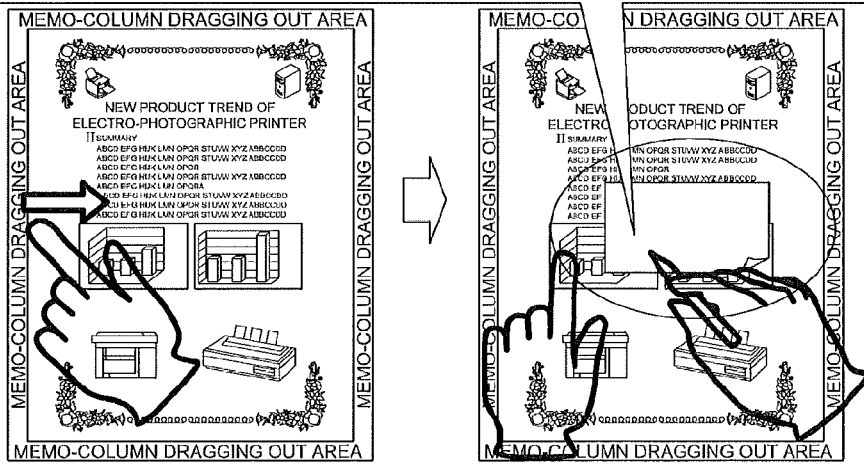

INFORMATION VIEWING APPARATUS, CONTROL PROGRAM AND CONTROLLING METHOD

This application is based on Japanese Patent Application NO. 2011-135583 filed on Jun. 17, 2011, with Japan Patent Office, the entire content of which is hereby incorporated by reference.

BACKGROUND OF THE INVENTION

The present invention relates to an information viewing apparatus, a control program and a controlling method, and specifically relates to such an information viewing apparatus that is provided with a display section, onto a displaying surface of which a touch panel is mounted, a control program that is to be executed in the information viewing apparatus concerned and a controlling method that is to be employed for controlling inputting operations conducted by using the touch panel mounted on the information viewing apparatus concerned.

In recent years, there have been increasing the number of users who employ such an apparatus that is provided with a display section, such as a tablet type terminal device, an Electrophoretic Display, an electronic book, etc., for viewing various kinds of documents, such as a material, a book, etc. The abovementioned apparatus (hereinafter, referred to as an information viewing apparatus) is provided with a touch panel mounted onto the display section, so as to make it possible to conduct various kinds of operations therefrom. For instance, since the annotation function is highly demanded for the information viewing apparatus, an operation for inputting a memo message can be achieved by operating the touch panel concerned.

With respect to the touch panel abovementioned, for instance, Tokkai 2003-280812 (Japanese Patent Application Laid-Open Publication) sets forth such a configuration, in regard to a touch-panel attached display device in which a first touch panel is arranged onto a display screen of a flexible paper display and a second touch panel is arranged below the flexible paper display abovementioned, that is provided with: a first position detecting section to detect a touch position touched by a designation body within the first touch panel, when the designation body designates a predetermined position within the paper display screen concerned; a second position detecting section to detect a touch position touched by the designation body within the second touch panel, when the designation body designates the predetermined position within the paper display screen concerned; and a control section that conducts a first processing corresponding to the detected result of the first position detecting section concerned, so as to establish a display status of the concerned display screen at a first display status corresponding to the touch position touched by the designation body and detected by the first position detecting section within the first touch panel, and conducts a second processing corresponding to the detected result of the second position detecting section concerned, so as to establish a display status of the concerned display screen at a second display status corresponding to the touch position touched by the designation body and detected by the second position detecting section within the second touch panel.

Further, with respect to the memo inputting operation to be conducted by employing the touch panel abovementioned, for instance, Tokkai 2007-279638 (Japanese Patent Application Laid-Open Publication) sets forth such a navigation apparatus that is provided with: a display monitor to detect a plurality of touched positions; an inputting section to input the plurality of touched positions on the display screen of the display monitor; an implementation section to implement various kinds of operation to be determined depending on the plurality of touched positions inputted through the inputting section; a memo inputting section to input a memo from a memo inputting screen displayed on the display monitor; a memo storage section to store the memo inputted by the memo inputting section while correlating the memo with a facility; a facility selecting section to select the facility displayed on the display monitor; and a memo displaying section to display the memo correlated with the facility and stored in the memo storage section, when the facility concerned is selected by the facility selecting section; wherein, in such a case that two touched positions within a map currently displayed on the display screen are detected, and one of the two touched positions represents the display position of the facility and the other one of the two touched positions is made to move in a lower direction of the display screen concerned, the implementation section abovementioned displays the memo inputting screen, into which a memo, correlated with the facility currently displayed at said one of the two touched positions and stored into the memo storage section, is to be inputted.

When a memo is inputted into a document by using the touch panel as above-mentioned, specifically by using such a touch panel that allows the user to conduct the multi-touch operation, it is desirable that the information viewing apparatus is so constituted that an operation for displaying the memo screen, an operation for inputting the memo into the memo screen, an operation for storing information representing the memo inputted into the memo screen, etc., can be achieved through consecutive and simplified operations.

However, according to the conventional method, it has been impossible not only to make the information viewing apparatus display or evacuate such a memo screen that is easy to input, but also to make the information viewing apparatus store information inputted into the memo screen, by conducting simplified operations. Accordingly, the abovementioned disadvantages have impeded the flow of operations to be conducted by the user, resulting in deterioration of the operability of the information viewing apparatus concerned. Further, as well as the above, the same kinds of problems have been also arisen in such a case that the information viewing apparatus is made to display a screen for setting various kinds of functions therefrom.

SUMMARY OF THE INVENTION

To overcome the abovementioned drawbacks in conventional information viewing apparatuses, it is one of objects of the present invention to provide an information viewing apparatus, a control program and a controlling method, each of which makes it possible for the user to conduct operations for inputting information and establishing various kinds of functions only by conducting the consecutive simplified operations from the multi-touchable touch panel.

Accordingly, at least one of the objects of the present invention can be attained by any one of the information viewing apparatuses, the control program and the controlling method described as follows.

(1) According to an information viewing apparatus reflecting an aspect of the present invention, the information viewing apparatus comprises: a display section that is provided with a multi-touchable touch panel, which includes a first touch panel and a second touch panel so as to make it possible to detect multi-touching operations to be conducted by a user, and which is mounted over a display surface thereof; and a control section that controls the display section, based on signals outputted by the multi-touchable touch panel; wherein, in such a state that the display section is made to display a document on the display surface, when detecting a predetermined dragging action performed on the first touch panel by the user, the control section makes the display section display such an inputting screen that makes it possible for the user to conduct an inputting operation from the second touch panel, during a time when a touching status, in which the user keeps touching a stop position of the first touch panel after stopping the predetermined dragging action at the stop position, is maintained in such a manner that the inputting screen overlaps the document; and wherein, when the touching status, maintained at the stop position after the predetermined dragging action, is released, the control section controls the display section so as to make the inputting screen evacuate from the document.

(2) According to another aspect of the present invention, in the information viewing apparatus recited in item 1, the control section makes the display section display a designating area in a periphery of a document display area within which the document is displayed, and, when detecting a dragging action performed from a point of dragging origin, located within the designating area, the control section makes the display section display the inputting screen in such a manner that the inputting screen overlaps the document.

(3) According to still another aspect of the present invention, in the information viewing apparatus recited in item 1, when determining that the predetermined dragging action, currently detected, is different from another dragging action for turning a page of the document, the control section makes the display section display the inputting screen in such a manner that the inputting screen overlaps the document.

(4) According to still another aspect of the present invention, in the information viewing apparatus recited in any one of items 1-3, the control section controls the display section so as to display the inputting screen at such a position that is located on a side of the point of dragging origin, referring to the stop position at which the predetermined dragging action has been stopped.

(5) According to still another aspect of the present invention, the information viewing apparatus, recited in any one of items 1-3, further comprises a storage section to store user's information in regard to the user, therein, and wherein, based on the user's information stored in advance in the storage section, the control section specify a dominant hand of the user who currently performs the predetermined dragging action, and controls the display section so as to display the inputting screen at such a position that is located on a side of the dominant hand of the user, referring to the stop position at which the predetermined dragging action has been stopped.

(6) According to still another aspect of the present invention, in the information viewing apparatus recited in item 5, when making the inputting screen evacuate from the document, the control section makes the storage section store either information, inputted into the inputted screen, or other information, established by operating the inputted screen, therein.

(7) According to still another aspect of the present invention, the information viewing apparatus, recited in any one of items 1-4, further comprises a storage section to store user's information in regard to the user, therein, and wherein, when making the inputting screen evacuate from the document, the control section makes the storage section store either information, inputted into the inputted screen, or other information, established by operating the inputted screen, therein.

(8) According to still another aspect of the present invention, in the information viewing apparatus recited in item 6 or item 7, after making the inputting screen evacuate from the document, the control section controls the display section so as to display an icon for displaying the information or the other information onto the display section.

(9) According to a control program reflecting still another aspect of the present invention, the control program to be executed by a CPU (Central Processing Unit) for implementing display controlling operations in an information viewing apparatus that includes a display section provided with a multi-touchable touch panel, which includes a first touch panel and a second touch panel so as to make it possible to detect multi-touching operations to be conducted by a user, and which is mounted over a display surface thereof, the control program being executable by a computer to cause the CPU to perform a process comprises: displaying a document onto the display surface of the display section; detecting a predetermined dragging action performed on the first touch panel by the user; making the display section display such an inputting screen that makes it possible for the user to conduct an inputting operation from the second touch panel, during a time when a touching status, in which the user keeps touching a stop position of the first touch panel after stopping the predetermined dragging action at the stop position, is maintained in such a manner that the inputting screen overlaps the document; and controlling the display section so as to make the inputting screen evacuate from the document when the touching status, maintained at the stop position after the predetermined dragging action, is released.

(10) According to a controlling method reflecting yet another aspect of the present invention, the controlling method to be employed in an information viewing apparatus, including a display section that is provided with a multi-touchable touch panel, which includes a first touch panel and a second touch panel so as to make it possible to detect multi-touching operations to be conducted by a user, and which is mounted over a display surface thereof, the controlling method comprises: displaying a document onto the display surface of the display section; detecting a predetermined dragging action performed on the first touch panel by the user; making the display section display such an inputting screen that makes it possible for the user to conduct an inputting operation from the second touch panel, during a time when a touching status, in which the user keeps touching a stop position of the first touch panel after stopping the predetermined dragging action at the stop position, is maintained in such a manner that the inputting screen overlaps the document; and controlling the display section so as to make the inputting screen evacuate from the document when the touching status, maintained at the stop position after the predetermined dragging action, is released.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 6a, FIG. 6b and FIG. 6c show schematic diagrams indicating exemplary memo columns to be displayed over a document based on a dominant hand of a user, embodied in the present invention as EMBODIMENT 1;

DETAILED DESCRIPTION OF THE PREFERRED EMBODIMENT

Figure 1:
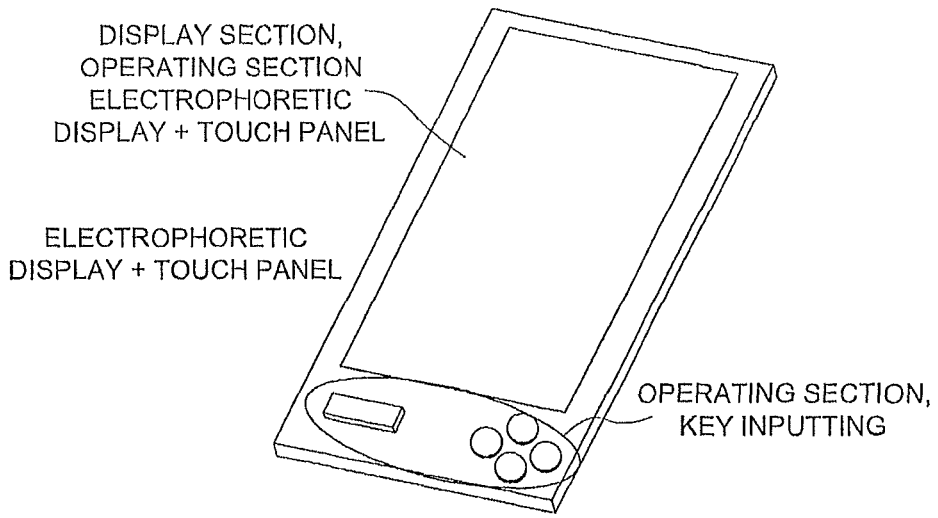
FIG. 1 shows a perspective view schematically indicating an outer appearance of an information viewing apparatus embodied in the present invention as EMBODIMENT 1.

As described in the "BACKGROUND OF THE INVENTION", the information viewing apparatuses that are provided with a touch panel (specifically, a multi-touchable touch panel), such as a tablet type terminal device, an Electrophoretic Display, an electronic book, etc., have been increasingly proliferated in the current market, and have been employed as the devices for viewing documents, such as a material, a document, etc. According to the conventional method, however, although it has been possible to make the concerned information viewing apparatus display a memo screen on a document by operating the touch panel, there has been such a problem that complicated operations are required for making the information viewing apparatus display the memo screen, for inputting a memo into the memo screen and for storing the memo, and this results in a bad operability.

Further, sometimes, various kinds of setting operations are to be conducted through the function setting screen. In that case, according to the conventional method, complicated operations are also required for making the information viewing apparatus display the function setting screen, for operating the function setting screen and for storing the setting information inputted by the user, and this results in a bad operability, as well.

In order to overcome the disadvantages in the conventional information viewing apparatuses as above-mentioned, a preferred embodiment of the present invention makes it possible to achieve the operations for inputting information and setting functions by conducting consecutive and simplified operations.

Concretely speaking, in the information viewing apparatus provided with a multi-touchable touch panel, an input/operation screen, such as a memo column, a function operating panel, etc., is displayed on a document by a dragging action performed by the first hand or the first finger of the operator, and then, the current display state of the input/operation screen is maintained by keeping the state of touching the current position after the dragging action, performed by the first hand or the first finger of the operator, is stopped at the current position. Successively, in the state that the input/operation screen is currently displayed, the touching action of the second hand or the second finger of the operator make it possible to input a memo message or to conduct a setting operation, and then, by releasing the first hand or the first finger of the operator from the touch panel, the input/operation screen is evacuated from the document concerned into outside thereof.

Further, according to the information viewing apparatus, embodied in the present invention, the display position of the input/operation screen is determined on the basis of a position from which the dragging action, performed by the first hand or the first finger of the operator, is commenced and another position at which the dragging action is stopped, or on the basis of a position of the dominant hand of the user and another position at which the dragging action is stopped. Still further, when the input/operation screen is made to evacuate the document towards outside thereof by releasing the first hand or the first finger of the operator from the touch panel, the information currently inputted, or the other information currently established is stored and an icon for displaying the information is displayed.

By conducting the abovementioned controlling operations, it becomes possible to achieve the consecutive operations from the displaying operation for displaying the input/operation screen, such as the memo column, the function operating panel, etc., to the storing operation for storing the information inputted by the user and the setting information currently established, and further, it becomes possible to display the input/operation screen at such a position that makes the operator to easily operate the input/operation screen by moving the second hand or the second finger, resulting in a drastic improvement of the usability and convenience of the user.

Embodiment 1

Figure 2:
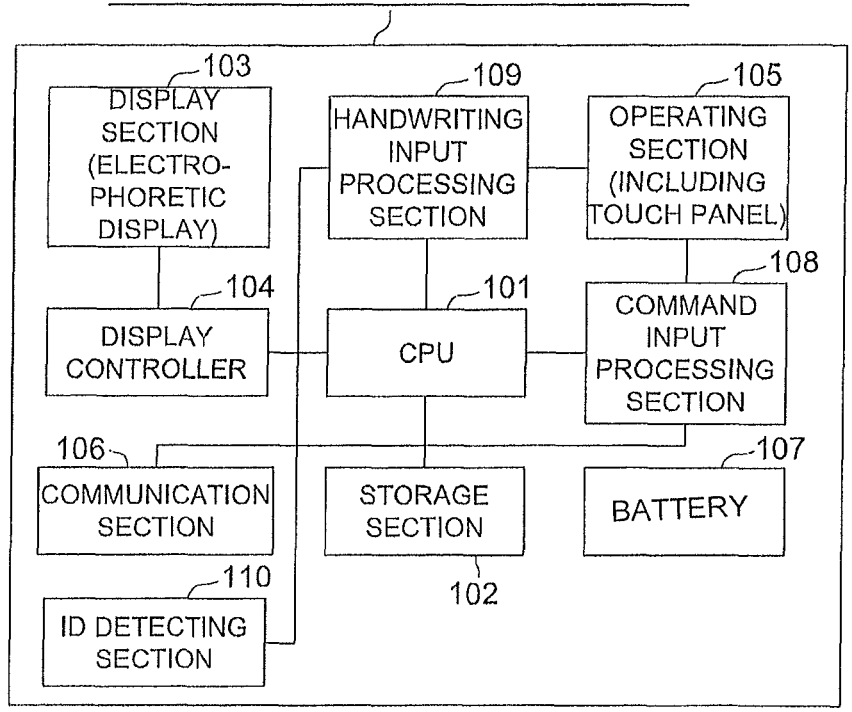
FIG. 2 shows a block diagram indicating a configuration of an information viewing apparatus embodied in the present invention as EMBODIMENT 1.
Figure 3A:
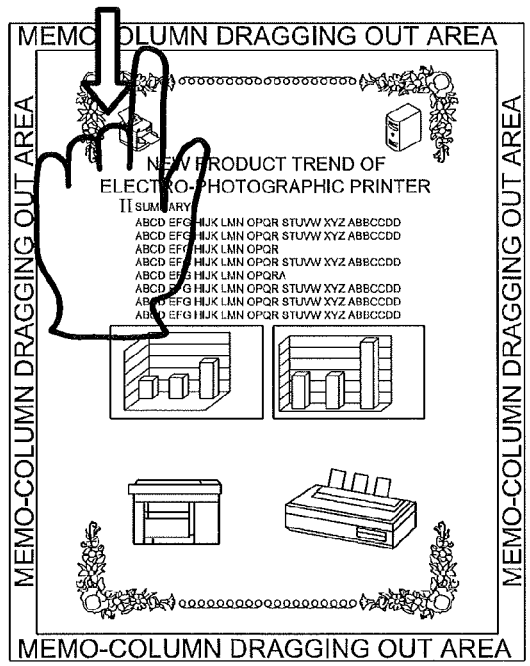
FIG. 3a, FIG. 3b and FIG. 3c show schematic diagrams indicating exemplary inputting actions for inputting information into a memo column embodied in the present invention as EMBODIMENT 1.
Figure 3B:
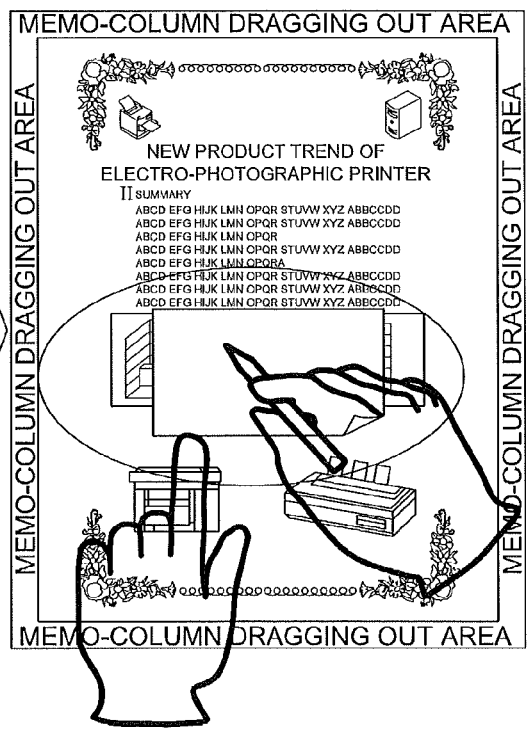
Figure 3C:
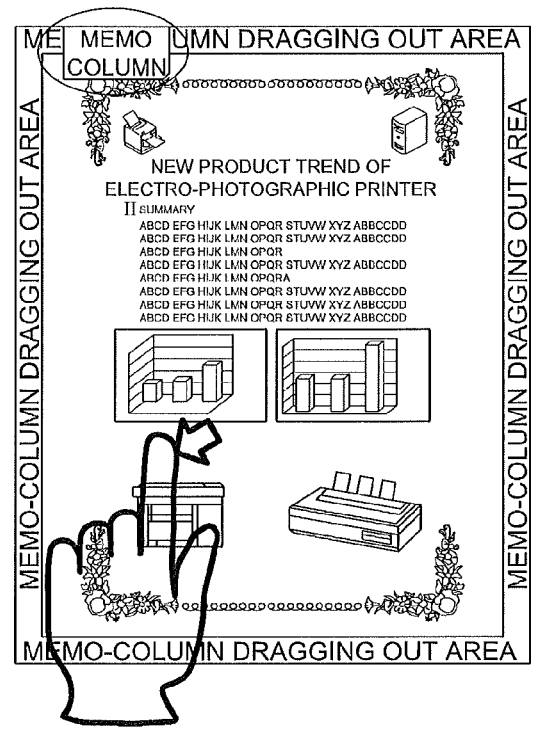
Figure 4A:
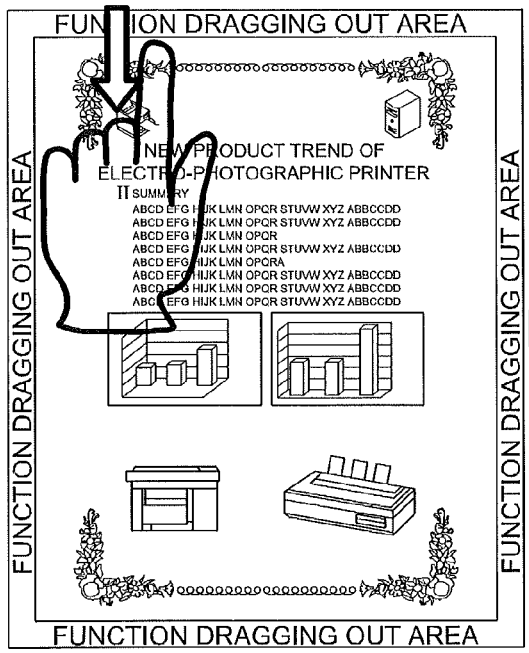
FIG. 4a, FIG. 4b and FIG. 4c show schematic diagrams indicating exemplary inputting actions for inputting information into a function operation panel embodied in the present invention as EMBODIMENT 1.
Figure 4B:
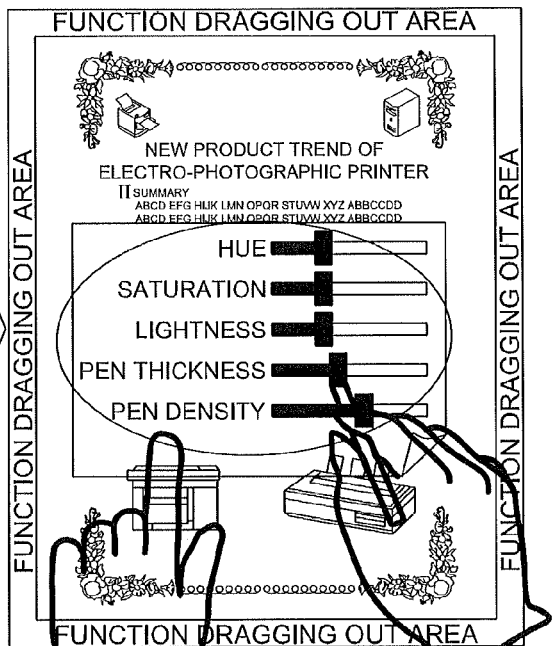
Figure 4C:
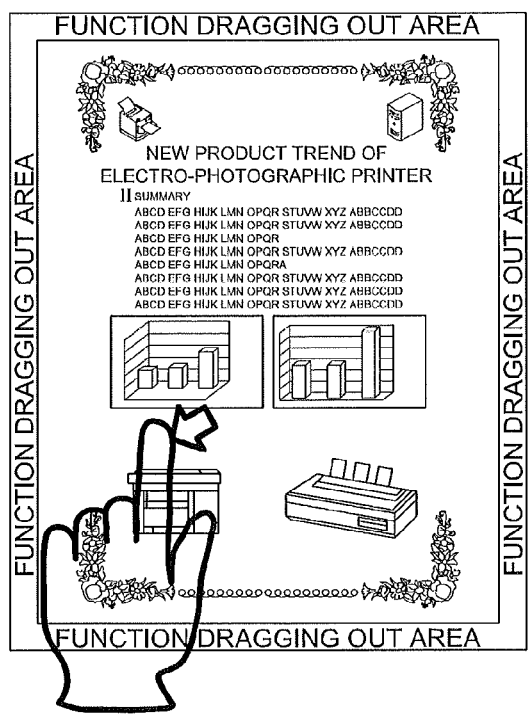

In order to further describe the preferred embodiment of the present invention in detail, referring to FIG. 1 through FIG. 9, an information viewing apparatus, a control program and a controlling method, embodied in the present invention as EMBODIMENT 1, will be detailed in the following. FIG. 1 shows a perspective view schematically indicating an outer appearance of an information viewing apparatus embodied in the present invention, and FIG. 2 shows a block diagram indicating a configuration of an information viewing apparatus embodied in the present invention. Further, FIG. 3a through FIG. 3c show schematic diagrams indicating exemplary inputting actions for inputting information into a memo column, while FIG. 4a through FIG. 4c show schematic diagrams indicating exemplary inputting actions for inputting information into the function operation panel, embodied in the present invention. Still further, FIG. 5a through FIG. 5c and FIG. 6a through FIG. 6c show schematic diagrams indicating exemplary memo columns, embodied in the present invention, to be displayed over a document. Yet further, FIG.

Figure 9:
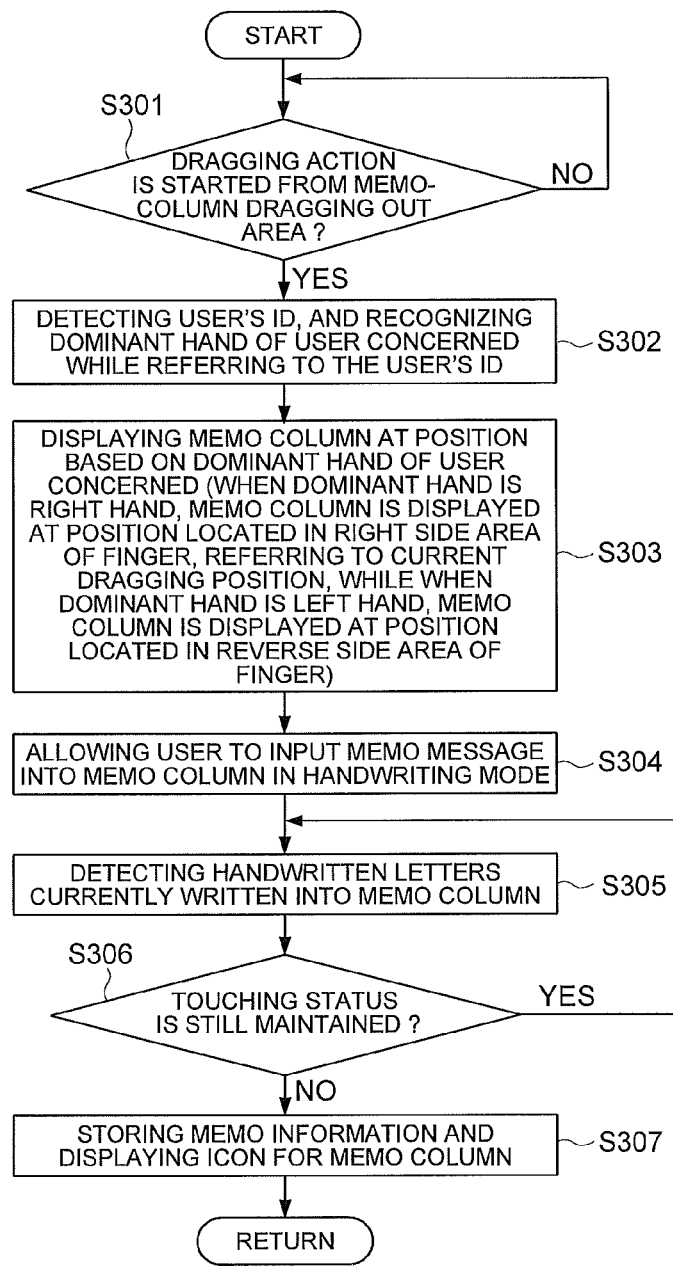
FIG. 9 shows a flowchart indicating a flow of operations for displaying a memo column (in case of a displaying operation based on a dominant hand of a user), to be conducted in the information viewing apparatus embodied in the present invention as EMBODIMENT 1.

7 through FIG. 9 show flowcharts indicating exemplary flows of operation controlling actions to be conducted by the information viewing apparatus, embodied in the present invention.

In this connection, hereinafter in the present specification, the dragging action is defined as an operation for making a finger or the like move substantially in a constant direction, in such a state that the finger or the like is made to keep touching the touch panel.

As shown in FIG. 1, an information viewing apparatus 100, embodied in the present invention, is defined as such an apparatus that is provided with a display function, such as a notebook sized personal computer, a tablet type terminal device, an Electrophoretic Display, an electronic book, etc. As shown in FIG. 2, the information viewing apparatus 100 is constituted by a CPU (Central Processing Unit) 101, a storage section 102, a display section 103, a display controller 104, an operating section 105, a communication section 106, a battery 107, a command input processing section 108, a handwriting input processing section 109, an ID (Identification) detecting section 110, etc.

The CPU 101 executes various kinds of control programs read out from the storage section 102, so as to serve as a controlling section for controlling various kinds of sections provided in the information viewing apparatus 100. Specifically in the present embodiment, based on signals outputted by the operating section 105 (touch panel), the CPU 101 specifies a touch position onto which a finger of the operator or the like currently touches, so as to conduct various kinds of operating actions on the basis of the touch position and/or a change of the touch position. For instance, initially, based on the touch position and/or the change of the touch position of the finger of the operator or the like (hereinafter, referred to as the first touching element), the CPU 101 makes the display section 103 display a screen for inputting a memo message or the like (hereinafter, referred to as a memo column), another screen for setting various kinds of functions therefrom or the like (hereinafter, referred to as a function operating panel), etc., over the document currently displayed, and makes the memo column or the function operating panel evacuate from the document towards outside thereof. Further, the CPU 101 allows the operator to input a memo message into the memo column by using the other finger or the like to be touched onto the touch panel next to the first touching element (hereinafter, referred to as the second touching element), and allows the operator to conduct a setting operation onto the function operating panel, and then, stores the information, inputted into the memo column, and the setting information, established from the function operating panel, into the storage section 102, and makes the display section 103 display the icon for displaying the information currently stored.

The storage section 102 is constituted by a ROM (Read Only Memory), a RAM (Random Access Memory), etc., so as to store various kinds of programs to be executed by the CPU 101, setting information for controlling the various kinds of operations to be conducted in the information viewing apparatus 100, various kinds of data (for instance, pattern data for recognizing hand written letters, etc., written into the memo column, user information for specifying the dominant hand of the user and document data), etc., therein.

The display section 103 is constituted by any one of or any combination of an EPD (Electrophoretic Display), an LCD (Liquid Crystal Display), an OELD (Organic Electroluminescence Display), etc., so as to display a document, to display a dragging area in the periphery of the document, detailed later, to display various kinds of screens, such as the memo column, the function operating panel, etc., over the document, and to display an icon for displaying the information inputted into the memo column, once stored, and the other information established from the function operating panel, thereon. In this connection, the Electrophoretic Display is such a display device that is constituted by a pair of transparent film substrates, an inner side surface of each of which is coated with a transparent electro-conductive electrode, black toner having an electro-conductive characteristic and white toner having an electro-insulation characteristic, both being encapsulated into a gap formed between the concerned electrodes, so that, when a voltage is applied between the concerned electrodes, the black toner moves and is replaced with the white toner, and as a result, the color of the display object changes.

The display controller 104 drives the display section 103, so as to control the displaying actions to be conducted by the display section 103, according to the command signals issued by the CPU 101.

The operating section 105 includes hardware keys, such as a power source switch button, etc., a pressure-sensitive or an electrostatic type touch panel, in which transparent electrodes are arranged in a lattice pattern, and which is formed over the display section 103, etc. The touch panel transmits signals, outputted from the transparent electrode arranged at a position which is currently depressed or touched by a finger of the operator or the like, to the CPU 101. In this connection, the touch panel to be employed for the present embodiment is configured as a multi-touchable touch panel that is capable of processing signals outputted from a plurality of transparent electrodes, which are currently depressed or touched by a plurality of fingers or the like.

The communication section 106 is constituted by a MC (Network Interface Card), a modem, etc., so as to communicate with a computer terminal device and/or a server, both of which are coupled to the network, in either the wired communication mode or the wireless communication mode, to receive document data, etc.

The battery 107 serves as a secondary battery to supply electric power to drive the various kinds of sections of the information viewing apparatus 100, etc.

The command input processing section 108 determines a meaning of the command designated by the touch panel, and notifies the CPU 101 of the command.

The handwriting input processing section 109 specifies handwritten locus based on the output signals of the touch panel, and correlates the concerned handwritten locus with the pattern data stored in advance into the display section 103 so as to recognize the handwritten characters, and then, notifies the CPU 101 of the result of the above-recognition processing.

The ID detecting section 110 identifies the user who currently operates the information viewing apparatus 100, and specifies the dominant hand of the user concerned. Although the scope of the method for specifying the dominant hand of the user is not limited specifically, for instance, when either a kind of character information, such as a user's ID, etc., is inputted or biological information of the user is detected at the time of booting up the information viewing apparatus 100, it is possible to specify the dominant hand of the user concerned on the basis of the user's information, by reading out the user's information, corresponding to the character information and/or the biological information concerned, from the storage section 102. Alternatively, it is also applicable that a screen, which allows the user to select the dominant hand therefrom, is displayed over another screen to be displayed onto the display section 103, so as to make it possible to specify the dominant hand according to the user's selection made from the screen concerned.

In this connection, it is needless to say that the configuration indicated by the block diagram shown in FIG. 2 is merely one of the various kinds of examples of the information viewing apparatus 100 embodied in the present invention, and can be adaptively modified as needed by a skilled person without departing from the spirit and scope of the invention. For instance, the command input processing section 108, the handwriting input processing section 109 and the ID detecting section 110, exemplified in the foregoing, may be configured as either hardware sections, or control programs to be executed by the CPU 101.

Next, referring to the drawings, the controlling operations to be conducted in the information viewing apparatus 100, embodied in the present invention, will be concretely detailed in the following.

As shown in FIG. 3a through FIG. 3c, with respect to the display screen to be displayed onto the display section 103 of the information viewing apparatus 100 embodied in the present invention, an area for displaying the memo column (hereinafter, referred to as a memo-column dragging out area) is provided in the periphery of the area within which the document is displayed, in such a manner that the memo-column dragging out area surrounds the document. In this connection, although the memo-column dragging out area is formed in a frame shape surrounding the document in the present embodiment, the scope of the shape of the memo-column dragging out area is not limited to that exemplified in the present embodiment, for instance, it is also applicable that a plurality of memo-column dragging out areas, each of which is formed in a rectangular shape, is separately arranged at a plurality of positions respectively located at upper, lower, left and right sides of the document.

Further, as shown in FIG. 3a, when making the information viewing apparatus 100 display the memo column, the operator puts down his finger of one hand (herein, the left hand) onto a predetermined position located within the memo-column dragging out area, and drags the concerned finger in a direction towards the document (herein, a lower direction) from the predetermined position serving as the point of origin. Then, as shown in FIG. 3b, a blank space, which is available as the memo column, emerges at a position at which the concerned finger has stopped. If the concerned finger is kept touching the touch panel (touching status), the information viewing apparatus 100 keeps displaying the memo column, and in this touching status, it becomes possible for the operator to input the memo message into the memo column by using another finger of another hand (herein, the right hand), a touch pen, etc., in the handwriting mode.

Successively, as shown in FIG. 3c, when the operator puts off the finger of one hand (left hand) from the touch panel (releases the touching status) after completing the operation for inputting the memo message into the memo column, the memo column disappears from the area of displaying the document. On that Occasion, the information currently inputted into the memo column is stored into the storage section 102. Further, at the same time, a mark (icon assigned as "MEMO") for commanding the information viewing apparatus 100 to display the information, currently inputted into the memo column, is displayed in the vicinity of the predetermined position within the memo-column dragging out area, which has served as the point of dragging origin.

As described in the above, since the information viewing apparatus 100 is so constituted that the memo-column dragging out area is provided as the periphery area surrounding the document concerned, and by putting down a finger or the like onto the memo-column dragging out area and by dragging the finger in the direction towards the document from the point of origin, the blank space, which is available as the memo column, emerges at the position at which the concerned finger has stopped, so as to make it possible for the operator to input the memo message into the memo column in the handwriting mode, and then, at the time when the touching status is released, the memo column disappears, the icon is displayed and the information currently inputted is stored, it becomes possible for the user to input the memo message only by conducting the consecutive operations simplified more than ever.

Although the schematic diagrams shown in FIG. 3a through FIG. 3c exemplify such a case that the memo message is written into the memo column in the handwriting mode, according to the controlling method embodied in the present invention, it is also possible to establish various kinds of functions by conducting operations similar to the above-mentioned. In this case, an area for displaying the function operating panel (hereinafter, referred to as a function dragging out area) is provided in the periphery of the area within which the document is displayed, in such a manner that the function dragging out area surrounds the document. In this connection, the scope of the shape of the function dragging out area is not limited to that exemplified in the present embodiment, for instance, it is also applicable that a plurality of function dragging out areas, each of which is formed in a rectangular shape, is separately arranged at a plurality of positions respectively located at upper, lower, left and right sides of the document.

Further, as shown in FIG. 4a, when making the information viewing apparatus 100 display the function operating panel, the operator puts down his finger of one hand (herein, the left hand) onto a predetermined position located within the function dragging out area, and drags the concerned finger in a direction towards the document (herein, a lower direction) from the predetermined position serving as the point of origin. Then, as shown in FIG. 4b, the function operating panel, which is available for establishing various kinds of functions therefrom, emerges at a position at which the concerned finger has stopped. If the concerned finger is kept touching the touch panel (touching status), the information viewing apparatus 100 keeps displaying the function operating panel, and in this touching status, it becomes possible for the operator to establish various kinds of functions (herein, various kinds of factors of a pen, such as a hue, a saturation, a lightness, a thickness, a density, etc.), by using another finger of another hand (herein, the right hand), a touch pen, etc., in the touching status.

Successively, as shown in FIG. 4c, when the operator puts off the finger of one hand (left hand) from the touch panel (releases the touching status) after completing the operation for establishing the various kinds of functions from the function operating panel, the function operating panel disappears from the area of displaying the document. On that Occasion, the information currently established from the function operating panel is stored into the storage section 102. Further, at the same time, an icon for commanding the information viewing apparatus 100 to display the information, currently established from the function operating panel, is displayed in the vicinity of the predetermined position within the function dragging out area, which has served as the point of dragging origin, as needed.

As described in the above, since the information viewing apparatus 100 is so constituted that the function dragging out area is provided as the periphery area surrounding the document concerned, and by putting down a finger or the like onto the function dragging out area and by dragging the finger in the direction towards the document from the point of dragging origin, the function operating panel, which is available for establishing various kinds of functions, emerges at the position at which the concerned finger has stopped, so as to make it possible for the operator to establish the various kinds of functions therefrom, and then, at the time when the touching status is released, the function operating panel disappears and the information currently established is stored, it becomes possible for the user to establish the various kinds of functions only by conducting the consecutive operations simplified more than ever.

In the foregoing, the fundamental operations of the controlling method, embodied in the present invention, have been described. Next, referring to FIG. 5a through FIG. 5c and FIG. 6a through FIG. 6c, with respect to the direction in which the concerned screen is to be displayed (display position of the screen), the detailed explanations will be given in the following. In this connection, although the following explanations exemplify only such the case that the memo column is to be displayed, the following explanations are also applicable for the case that the function operating panel is to be displayed, as well.

Figure 5A:
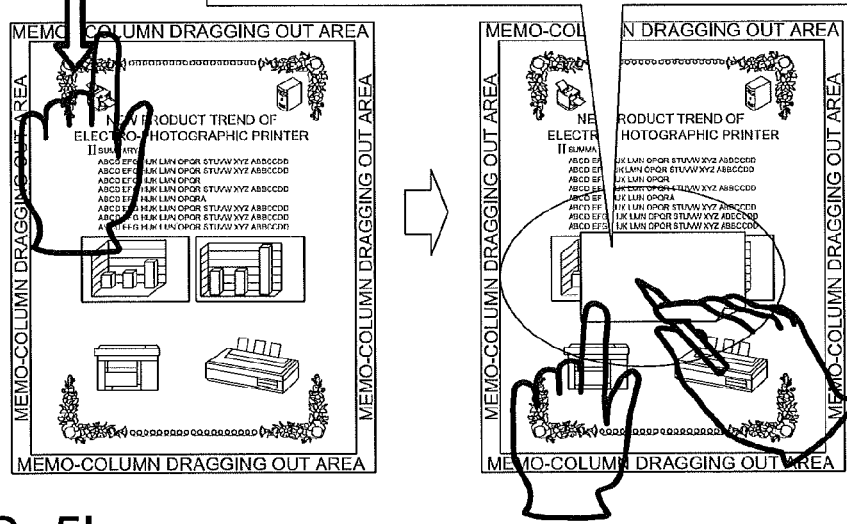
FIG. 5a, FIG. 5b and FIG. 5c show schematic diagrams indicating exemplary memo columns to be displayed over a document based on a dragging start position, embodied in the present invention as EMBODIMENT 1.
Figure 5B:
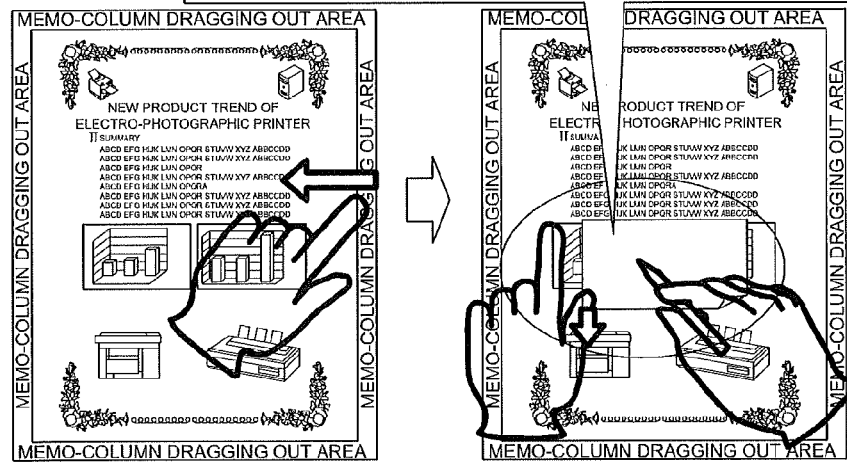
Figure 5C:
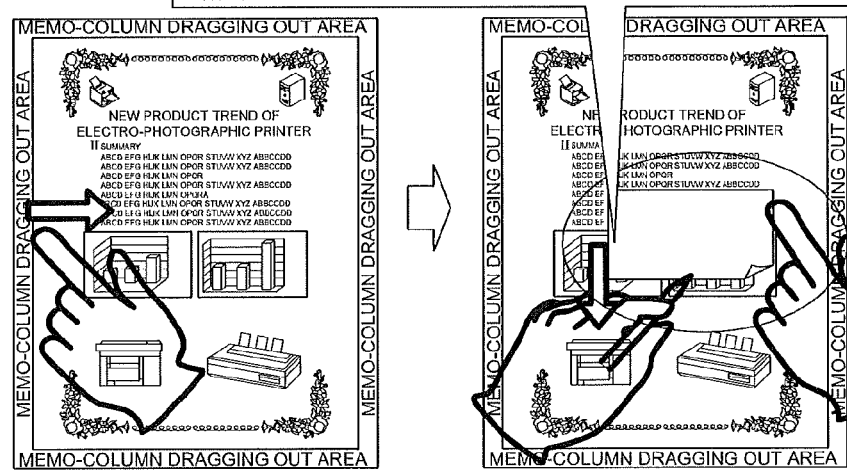

The schematic diagrams, shown in FIG. 5a through FIG. 5c, indicate an exemplary method for determining a direction in which the concerned screen is to be displayed (display position of the screen). As well as the schematic diagram shown in FIG. 3a, the schematic diagram shown in FIG. 5a indicates such a case that the dragging action is started from the point of dragging origin within the memo-column dragging out area located at the upper side of the document currently displayed. In this case, the memo column is displayed at a position in an upper side direction of the finger currently stopped. In this connection, when the dragging action is started from the point of dragging origin within the memo-column dragging out area located at the lower side of the document currently displayed, the memo column is displayed at a position in an lower side direction of the finger currently stopped, though this case is not shown in the drawings.

The schematic diagram shown in FIG. 5b indicates such a case that the dragging action is started from the point of dragging origin within the memo-column dragging out area located at the right side of the document currently displayed. In this case, the memo column is displayed at a position in a right side direction of the finger currently stopped. Further, the schematic diagram shown in FIG. 5c indicates such a case that the dragging action is started from the point of dragging origin within the memo-column dragging out area located at the left side of the document currently displayed. In this case, the memo column is displayed at a position in a left side direction of the finger currently stopped.

In this connection, although the display direction of the memo column, indicated in the schematic diagram shown in FIG. 5b, is convenient for such an operator whose dominant hand is the right hand and who fills the memo message into the memo column by using the dominant hand (right hand) in the handwriting mode, when an operator whose dominant hand is the left hand and who fills the memo message into the memo column by using the dominant hand (left hand) in the handwriting mode, the non-dominant hand (right hand) disturbs the writing action of the left hand. Conversely, although the display direction of the memo column, indicated in the schematic diagram shown in FIG. 5c, is convenient for such an operator whose dominant hand is the left hand and who fills the memo message into the memo column by using the dominant hand in the handwriting mode, when an operator whose dominant hand is the right hand and who fills the memo message into the memo column by using the dominant hand (right hand) in the handwriting mode, the non-dominant hand (left hand) disturbs the writing action of the right hand. Accordingly, in order to make it easy to fill the memo message into the memo column, it is also applicable that the ID detecting section 110 recognizes the dominant hand of the user, so as to determine the display direction of the memo column in conformity with the dominant hand of the user concerned.

The schematic diagrams, shown in FIG. 6a through FIG. 6c, indicate an exemplary method for determining a direction in which the concerned screen is to be displayed, corresponding to the dominant hand (herein, right hand) of the user. In any one of the first case that the dragging action is started from the point of dragging origin within the memo-column dragging out area located at the upper side of the document, as shown in FIG. 6a, the second case that the dragging action is started from the point of dragging origin within the memo-column dragging out area located at the right side of the document, as shown in FIG. 6b, and the third case that the dragging action is started from the point of dragging origin within the memo-column dragging out area located at the left side of the document, as shown in FIG. 6c, if the memo column is displayed in the right side direction of the finger currently stopped, it becomes possible to fill the memo message into the memo column by using the dominant hand (right hand) without being disturbed by the non-dominant hand (left hand) that has dragged the memo column.

Figure 7:
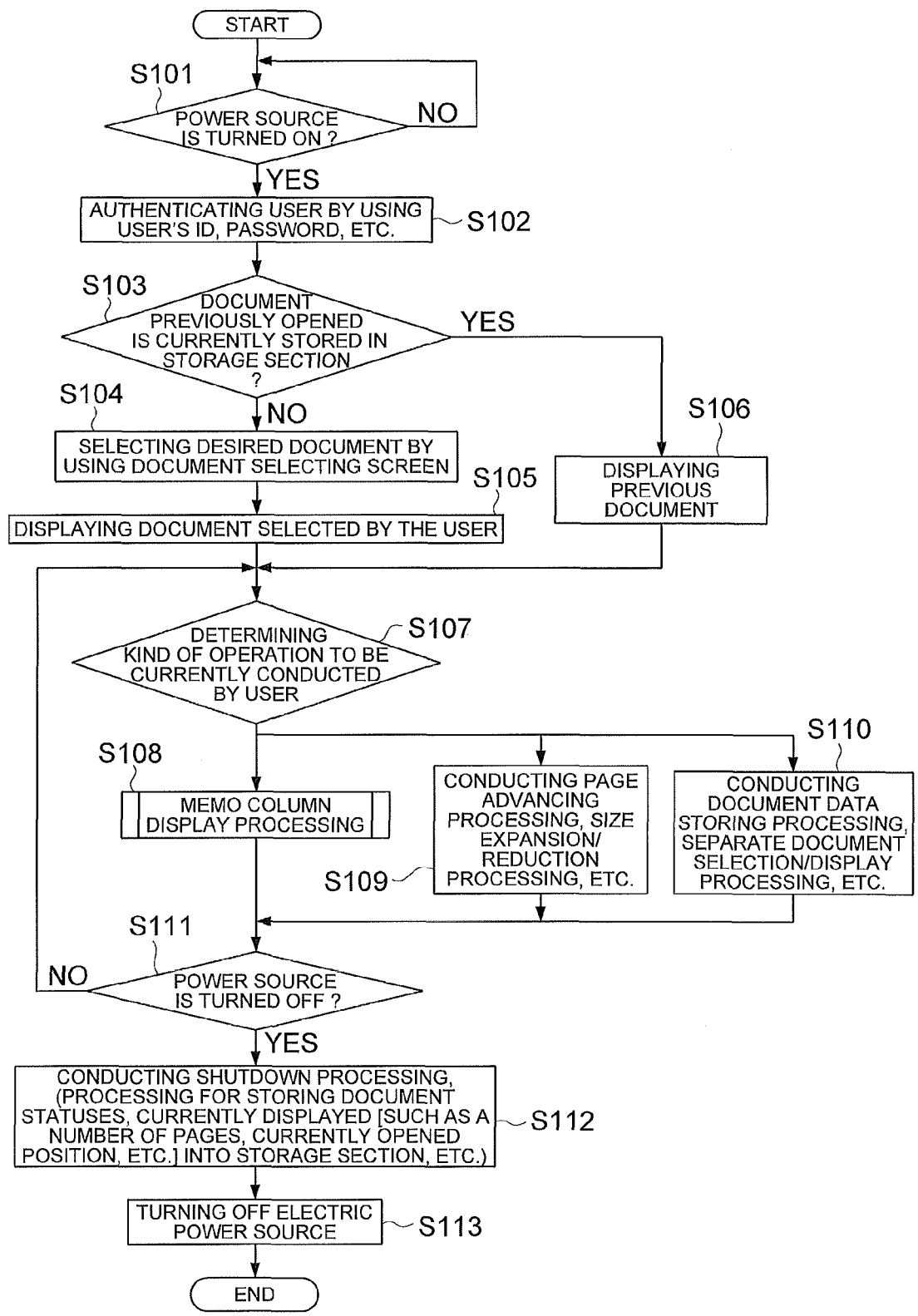
FIG. 7 shows a flowchart indicating a flow of overall processing to be conducted in the information viewing apparatus, embodied in the present invention as EMBODIMENT 1.
Figure 8:
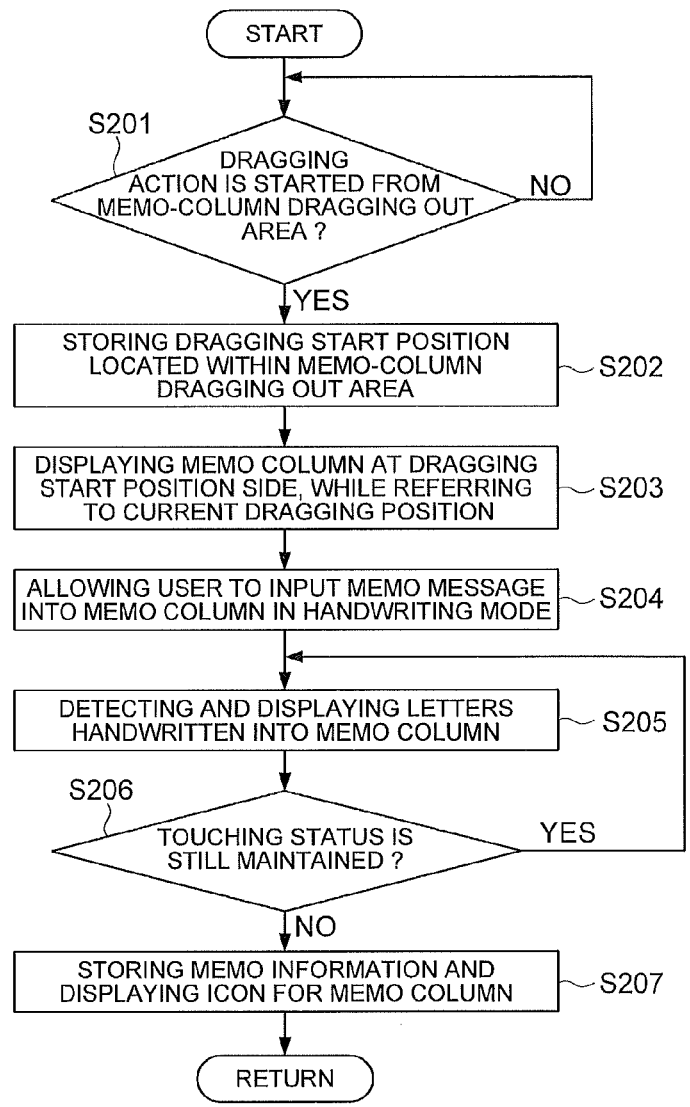
FIG. 8 shows a flowchart indicating a flow of operations for displaying a memo column (in case of a displaying operation based on a dragging start position), to be conducted in the information viewing apparatus embodied in the present invention as EMBODIMENT 1.

Next, referring to the flowcharts shown in FIG. 7 through FIG. 9, the operations of the information viewing apparatus 100 will be detailed in the following. FIG. 7 shows a flowchart indicating a flow of overall processing to be performed in the information viewing apparatus 100, while FIG. 8 and FIG. 9 show flowcharts indicating details of the memo column display processing to be performed in Step S103 shown in FIG. 7.

Detecting the ON status of the power source (Step S101; Yes), the CPU 101 of the information viewing apparatus 100 makes the display section 103 display a predetermined authentication screen thereon, so as to make it possible for the user to input a user's ID, a password, etc., therefrom. Then, the CPU 101 compares the user's ID and the password, inputted by the user, with the user's information stored in advance in the storage section 102, so as to conduct the processing for authenticating the user concerned (Step S102).

Successively, the CPU 101 determines whether or not the data of the document previously opened is currently stored in the storage section 102 (Step S103). When determining that the data concerned is currently stored in the storage section 102 (Step S103; Yes), the CPU 101 makes the display section 103 display the document represented by the data concerned, thereon (Step S106). On the other hand, when determining that the data concerned is not currently stored in the storage section 102 (Step S103; No), the CPU 101 makes the display section 103 display a predetermined document selecting screen thereon, so as to make it possible for the user to select a document desired (Step S104), and then, makes the display section 103 display the document, selected by the user, thereon (Step S105).

In the state that the document is displayed, the CPU 101 determines a kind of operation currently conducted by the user (Step S107). When determining that the operation for displaying the memo column is conducted by the user, the CPU 101 executes the controlling program so as to implement a memo column display processing (consecutive processing form the operation for displaying the memo column to the operation for storing the information representing the memo message written into the memo column in the handwriting mode) (Step S108). The memo column display processing abovementioned will be detailed later on. On the other hand, when determining that the operation for operating the document is conducted by the user, the CPU 101 executes the controlling program so as to conduct such processing that include a page advancing processing, a size expansion/reduction processing, etc., (Step S109). Further, when determining that the operation for operating the file is conducted by the user, the CPU 101 executes the controlling program so as to conduct such processing that include a document data storing processing, a separate document selection/display processing, etc., (Step S110).

After that, detecting the OFF status of the power source (Step S111; Yes), the CPU 101 conducts a predetermined shutdown processing, for instance, processing for storing the document statuses, currently displayed (such as a number of pages, a currently opened position, a magnification factor, etc.), into the storage section 102 (Step S112), and turns OFF the electric power source of the information viewing apparatus 100 (Step S113).

Next, referring to the flowcharts shown in FIG. 8 and FIG. 9, the memo column display processing will be detailed in the following. FIG. 8 shows a flowchart indicating a flow of operations for displaying the memo column based on the dragging start position, while, FIG. 9 shows a flowchart indicating a flow of operations for displaying the memo column based on the dominant hand of the user concerned.

When the memo column is displayed on the basis of the dragging start position, as indicated in the flowchart shown in FIG. 8, detecting the dragging action performed from the memo-column dragging out area (Step S201; Yes), the CPU 101 stores the dragging start position located within the memo-column dragging out area (Step S202). Successively, referring to the current dragging position (dragging stop position), the CPU 101 displays the memo column at the dragging start position side (Step S203), and allows the user to input the memo message into the memo column in the handwriting mode (Step S204).

For instance, as shown in FIG. 5*a* through FIG. 5*c*, when the dragging action is started from a point of dragging origin within the memo-column dragging out area located at an upper side of a document currently displayed, the memo column is displayed at a position located at an upper side of the finger currently stopped. Further, when the dragging action is started from another point of dragging origin within the memo-column dragging out area located at a right side of the document, the memo column is displayed at a position located at a right side of the finger currently stopped. Still further, when the dragging action is started from still another point of dragging origin within the memo-column dragging out area located at a left side of the document, the memo column is displayed at a position located at a left side of the finger currently stopped. Yet further, when the dragging action is started from yet another point of dragging origin within the memo-column dragging out area located at a lower side of the document, the memo column is displayed at a position located at a lower side of the finger currently stopped, though this case is not shown in the drawings. According to the abovementioned features of the present invention, it becomes possible for the user to input a memo message into the memo column, which is currently displayed in the direction desired by the user, in the handwriting mode.

Successively, detecting handwritten letters currently written into the memo column, the CPU 101 displays the letters, etc., onto the memo column concerned (Step S205). Then, determining whether or not the touching status is still maintained (Step S206), the CPU 101 continues the detection/display operation for allowing the user to input the memo message in the handwriting mode during the time when determining that touching status is still maintained (Step S206; Yes). On the other hand, when determining that the touching status is released (Step S206; No), the CPU 101 stores information, representing the characters recognized by the handwriting input processing section 109, into the storage section 102, and display an icon for making the information viewing apparatus 100 display the information above-stored, onto the display section 103, as needed (Step S207). According to the abovementioned feature of the present invention, it becomes possible for the user to confirm the contents of the memo message, handwritten into the memo column, only by clicking the icon at any time when the user wishes to view the memo message concerned.

On the other hand, when the memo column is displayed on the basis of the user's dominant hand, as shown in FIG. 9, detecting the dragging action performed from the memo-column dragging out area (Step S301; Yes), the CPU 101 acquires a user's ID from the ID detecting section 110, and refers to the user's information stored in advance in the storage section 102, so as to recognize the dominant hand of the user concerned (Step S302). Then, the CPU 101 displays the memo column at a position located in such a side area that does not disturb the user to input the memo message into the memo column (Step S303), and allows the user to input the memo message into the memo column in the handwriting mode (Step S304).

For instance, when the user's dominant hand is the right hand, as shown in FIG. 6, the CPU 101 displays the memo column at a position located in a right side area of the finger currently stopped, even if the dragging action is started from such a point of dragging origin within the memo-column dragging out area, that is located at any one of upper, lower, right and left sides of the document currently displayed. Further, when the user's dominant hand is the left hand, though this case is not shown in the drawings, the CPU 101 displays the memo column at a position located in a left side area of the finger currently stopped, even if the dragging action is started from such a point of dragging origin within the memo-column dragging out area, that is located at any one of upper, lower, right and left sides of the document currently displayed. According to this feature of the present invention, it becomes possible for the user to input a memo message into the memo column, which is currently displayed in the direction desired by the user, in the handwriting mode.

Successively, detecting handwritten letters currently written into the memo column, the CPU 101 displays the letters, etc., onto the memo column concerned (Step S305). Then, determining whether or not the touching status is still maintained (Step S306), the CPU 101 continues the detection/display operation for allowing the user to input the memo message in the handwriting mode during the time when determining that touching status is still maintained (Step S306; Yes). On the other hand, when determining that the touching status is released (Step S306; No), the CPU 101 stores information representing the characters, recognized by the handwriting input processing section 109, into the storage section 102, and display an icon for making the information viewing apparatus 100 display the information above-stored, onto the display section 103, as needed (Step S307). According to the abovementioned feature of the present invention, it becomes possible for the user to confirm the contents of the memo message, handwritten into the memo column, only by clicking the icon at any time when the user wishes to view the memo message concerned.

As described in the foregoing, since the information viewing apparatus 100, embodied in the present invention, is so constituted that the memo-column/function dragging out area is provided as the periphery area surrounding the area for displaying the document concerned, and during the time when the touching status is kept after the dragging action has been performed from the point of dragging origin located within the memo-column/function dragging out area, either the memo column or the function operating panel is displayed at a position located in an area towards the dragging-action start point side or the user's dominant hand side based on the position at which the dragging action is stopped, it becomes possible for the user not only to fill a memo message into the memo column in an easy way, but also to establish a function from the function operating panel in an easy way.

Further, since the information viewing apparatus 100, embodied in the present invention, is so constituted that, when the touching status is released, the memo column or the function operating panel is made to evacuate towards outside the document concerned, and at the same time, information representing the memo message, written into the memo column in the handwriting mode, or information representing the function, established from the function operating panel, is stored into the storage section 102, and alternatively displayed is an icon for displaying the memo message or the function represented by the information as needed, it becomes possible for the user to confirm the contents of the memo message handwritten into the memo column, or the setting status of the functions currently established, only by clicking the icon at any time when the user wishes to view the contents of the information concerned.

Embodiment 2

Figure 10:
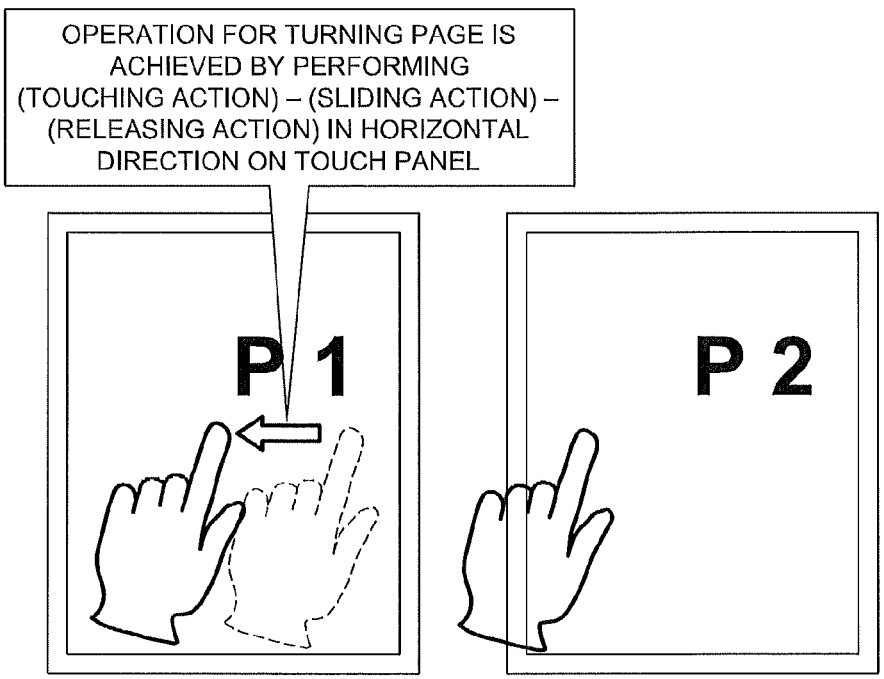
FIG. 10 shows a schematic diagram indicating an operation for turning over a page.

Next, referring to the schematic diagrams shown in FIG. 10, FIG. 11a, FIG. 11b, FIG. 11c, FIG. 12a and FIG. 12b, an information viewing apparatus, a control program and a controlling method, each embodied in the present invention as EMBODIMENT 2, will be detailed in the following. FIG. 10 shows a schematic diagram indicating an operation for turning over a page, while FIG. 11a, FIG. 11b, FIG. 11c, FIG. 12a and FIG. 12b show schematic diagrams indicating operations for displaying the memo column embodied in the present invention.

According to EMBODIMENT 1 described in the foregoing, the information viewing apparatus 100 is so constituted that the specific area, such as the memo-column dragging out area, the function dragging out area, etc., is provided as the periphery area surrounding the area for displaying the document concerned, so as to display the memo column or the function operating panel when the dragging action is started from the point of dragging origin located within the specific area. According to EMBODIMENT 2, however, instead of providing such the specific area as abovementioned, the information viewing apparatus 100 is so constituted that, when a specific action, performed by the operator (user), is detected, the specific action concerned is determined as an instruction for displaying the memo column or the function operating panel. On that occasion, since the dragging action in the left or right direction of the document is also performed for turning over the page of the document currently displayed on the display section 103, the controlling operations are conducted in such a manner that the memo column or the function operating panel is displayed, only when a kind of action, which is distinguishable from the dragging action abovementioned, is performed.

Now, referring to the schematic diagrams shown in FIG. 10, FIG. 11a, FIG. 11b, FIG. 11c, FIG. 12a and FIG. 12b, EMBODIMENT 2 will be detailed in the following. In this connection, although the explanations will be given by exemplifying the case of displaying the memo column, herein, the following explanations are also applicable for the case of displaying the function operating panel, as well.

In an information viewing apparatus, which makes it possible for an operator to turn a page through the touch panel, when the operator touches the touch panel with one of his fingers, and performs such a dragging action in a left-right direction of the document while keeps touching the touch panel, and then, releases the finger from the touch panel, as shown in FIG. 10, the information viewing apparatus concerned determines the operator's action abovementioned as the instruction for turning the page, and turns the current page to the next page of the document concerned.

Figure 11A:
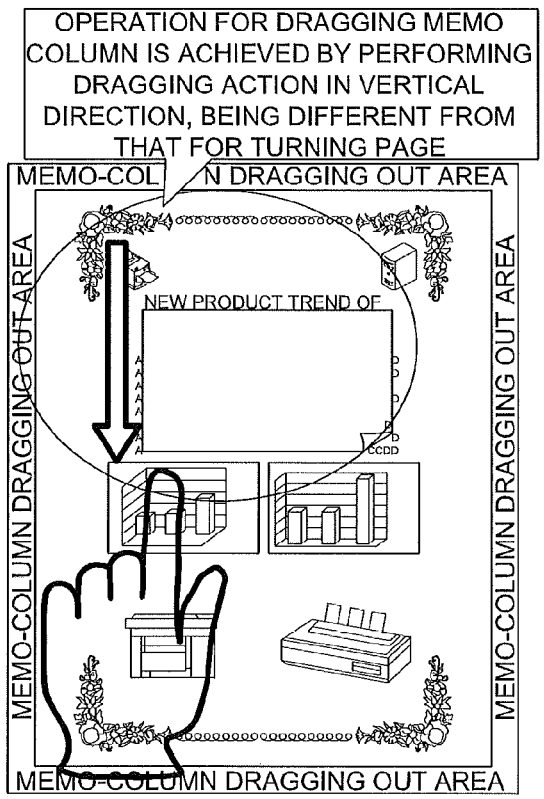
FIG. 11a, FIG. 11b and FIG. 11c show schematic diagrams indicating operations for displaying a memo column embodied in the present invention as EMBODIMENT 2.
Figure 11B:
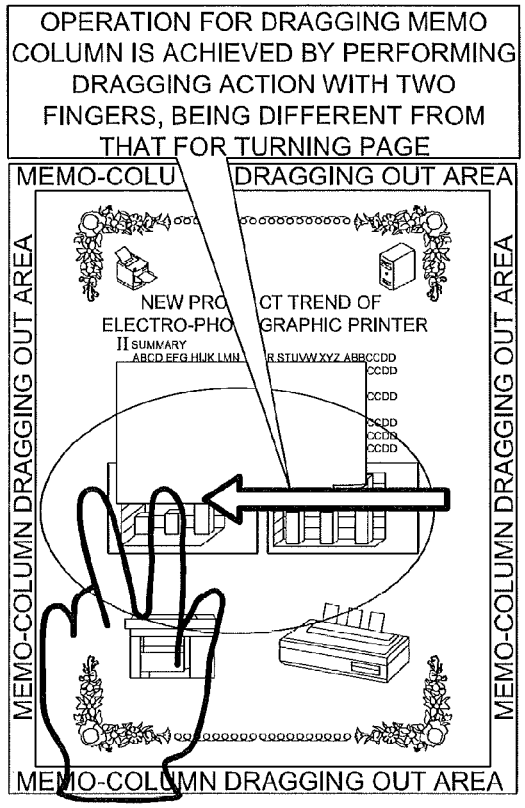
Figure 11C:
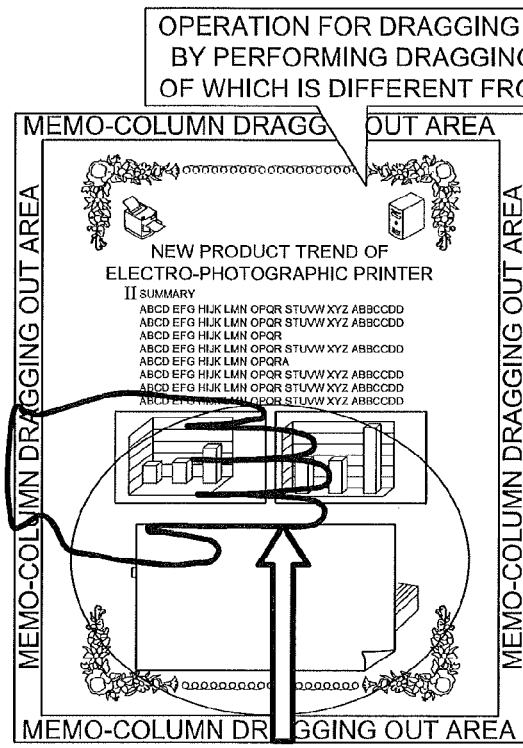

In contrast to the above, according to the information viewing apparatus 100 serving as EMBODIMENT 2, when the operator performs such an action for dragging the finger in an upper-lower direction of the document, which is different from the direction (left-right direction of the document) for turning a page, as shown in FIG. 11a, the CPU 101 determines the operator's action abovementioned as the instruction for displaying the memo column, and makes the display controller 104 display the memo column onto the display section 103. Alternatively, when the operator performs such a dragging action that is different from the page turning operation in a dragging mode (for instance, touching the touch panel with two fingers) as shown in FIG. 11b, the CPU 101 determines the operator's action abovementioned as the instruction for displaying the memo column, and makes the display controller 104 display the memo column onto the display section 103. Still alternatively, when the operator performs such a dragging action that employs a part of human body, an area of which is larger than that of the tip of the finger (for instance, all area of the palm of the operator's hand), for touching and dragging on the touch panel, as shown in FIG. 11c, the CPU 101 determines the operator's action abovementioned as the instruction for displaying the memo column, and makes the display controller 104 display the memo column onto the display section 103.

Figure 12A:
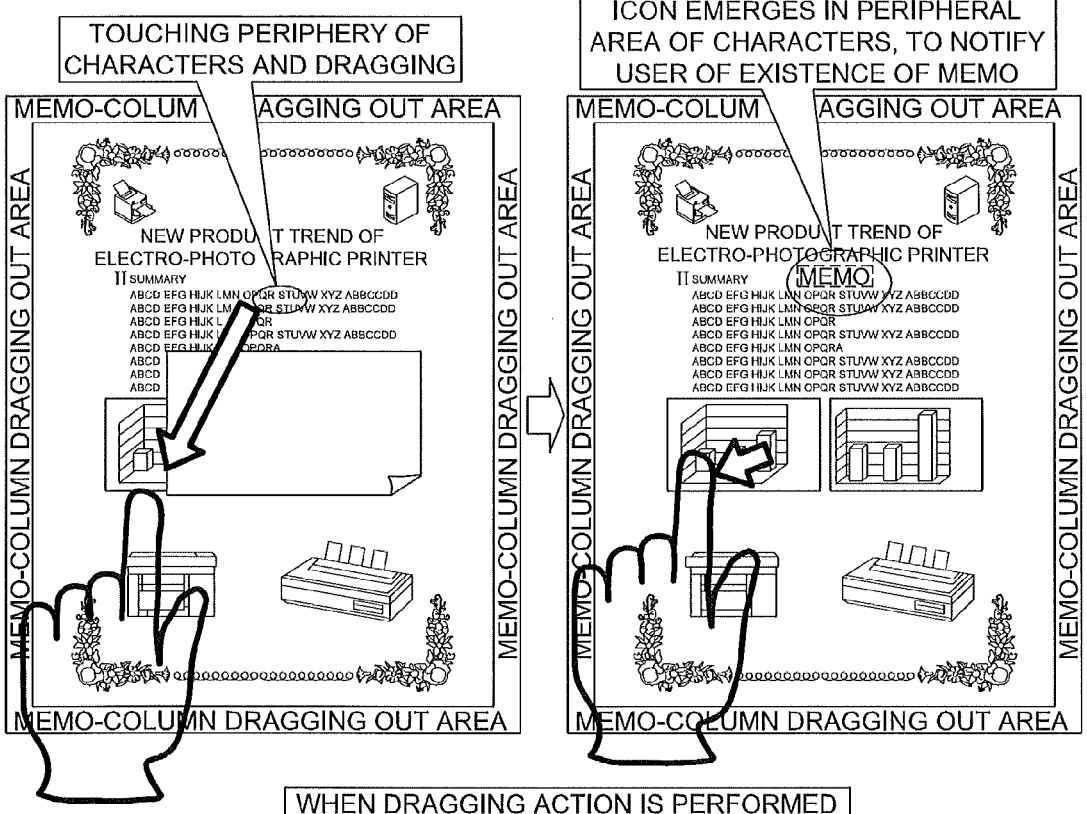
FIG. 12a and FIG. 12b show schematic diagrams indicating operations for displaying a memo column embodied in the present invention as EMBODIMENT 2.

In this connection, when the memo column is displayed with respect to a predetermined character or a predetermined sentence, it is possible to display the icon at a position in the vicinity of the specific character or the specific sentence concerned. For instance, as shown in FIG. 12a, when the memo column is displayed by dragging the finger in a direction being different from that for the page turning operation, it is possible to display the icon at a position located within a peripheral area of the predetermined character or the predetermined sentence by releasing the touching status.

As described in the foregoing, instead of providing a specific aria in a circumferential area of the screen, by performing a specific operation, which is distinguishable from the operations for the document, it becomes possible to display the memo column or the function operating panel on the screen, and accordingly, it becomes possible to obtain the effects similar to those obtained in EMBODIMENT 1.

In this connection, the scope of the present invention is not limited to EMBODIMENT 1 and EMBODIMENT 2, described in the foregoing. Modifications and additions, made by a skilled person without departing from the spirit and scope of the invention, shall be included in the present invention.

Figure 12B:
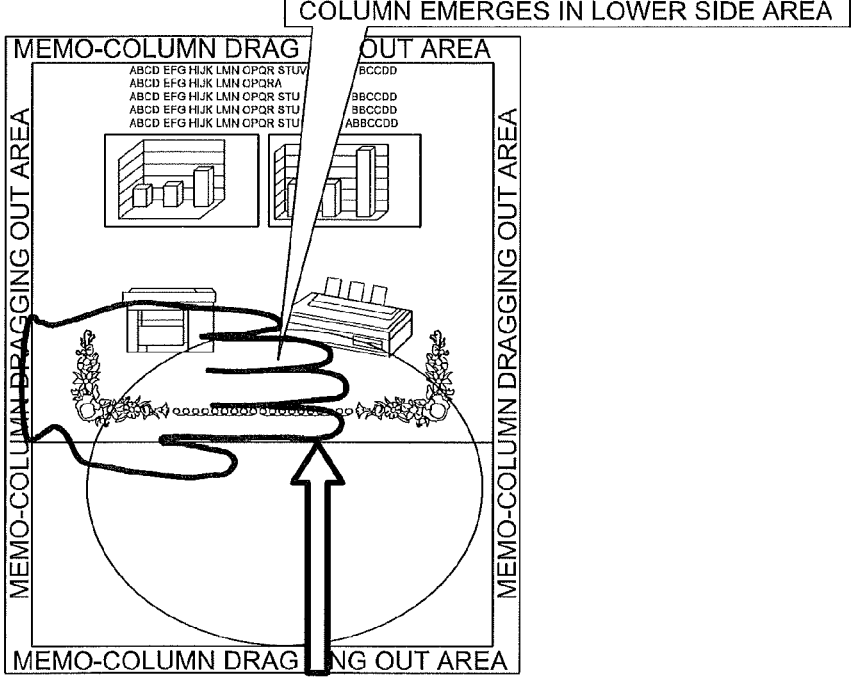

For instance, although such the case that the memo column or the function operating panel is to be displayed over the document currently displayed has been detailed in the foregoing, it is also applicable that the information viewing apparatus 100 is so constituted that the memo column or the function operating panel is to be displayed so as not to overlap with the document concerned. For instance, as shown in FIG. 12b, when the operator touches the touch panel with the whole area of the palm of the operator's hand, and then, slides the palm of the operator's hand so as to drag the document towards outside the screen, the blank area from which the document has evacuated may be available for the memo column.

Further, although such the cases that the memo column or the function operating panel is to be displayed have been detailed by exemplifying EMBODIMENT 1 and EMBODIMENT 2 in the foregoing, the present invention is also applicable for such a case that an arbitral kind of screen, from which the operator can conduct inputting or other operations, is to be displayed, as well.

The present invention is available for an apparatus that is provided with a multi-touchable touch panel, a program to be executed in the apparatus concerned and a method for controlling inputting and setting operations.

According to an information viewing apparatus, a control program and a controlling method, each of which is embodied in the present invention, it becomes possible for the user to conduct operations for inputting information and establishing various kinds of functions only by conducting the consecutive simplified operations from the multi-touchable touch panel.

This is because, in a state that a document is displayed on the display surface, when detecting a predetermined dragging action (defined as such a dragging action that is different from another dragging action to be started from a point of dragging origin located within the dragging out area provided as the peripheral area of the document, or still another dragging action for turning over a page of the document), the control section of the information viewing apparatus (control program) makes the display section display such an inputting screen or a setting screen that makes it possible for the user to conduct an inputting or setting operation from the second touch panel, during the time when a touching status, in which the user keeps touching a stop position of the first touch panel after stopping the predetermined dragging action at the stop position, is maintained in such a manner that the inputting screen or the setting screen overlaps the document, and, when the touching status, maintained at the stop position after the predetermined dragging action, is released, the control section of the information viewing apparatus (control program) controls the display section so as to make the inputting screen or the setting screen evacuate from the document. Further, in addition to the above, when displaying the inputting screen or the setting screen, the control section of the information viewing apparatus (control program) determines the display position of the inputting screen or the setting screen, corresponding to the stop position of the dragging action, based on the information representing the dominant hand of the user, and, when making the inputting screen or the setting screen evacuate towards outside the document, the control section stores the information inputted into the inputting screen or the other information established from the setting screen into storage section, and displays the icon for displaying information above-stored.

While the preferred embodiments of the present invention have been described using specific term, such description is for illustrative purpose only, and it is to be understood that changes and variations may be made without departing from the spirit and scope of the appended claims.

What is claimed is:
1. An information viewing apparatus, comprising:
  a display section provided with a multi-touchable touch panel which generates signals when touched, wherein the multi-touchable touch panel is mounted over a display surface and configured to simultaneously detect:
    a first touching operation performed by a user at a first touch position that is at a point of dragging origin located within a designating area at a periphery of a document display area in which a document is displayed, and
    a second touching operation performed by the user at a second touch position,
  wherein the first touch position is different than the second position, and
  a processor that controls the display section based on signals outputted by the multi-touchable touch panel, the processor being configured to:
    display the document onto the display surface of the display section;
    cause the display section to display the designating area at the periphery of the document display area in which the document is displayed;
    detect that a predetermined dragging action is the first touching operation at the first touch position by the user by dragging from the first touch position to a stop touch position,
    cause the display section to display an inputting screen in which the user is able to conduct an inputting operation on the inputting screen as the second touching operation performed at the second touch position, the inputting screen displayed in such a manner that the inputting screen overlaps the document and cause the inputting screen to be continuously displayed while the user maintains contact with the stop touch position; and
    control the information viewing apparatus display section so as to, when the user releases contact with the stop touch position, with which the user has kept touching after dragging from the first touch position to the stop touch position, cause the display section to evacuate the inputting screen from the document when the user releases contact with the stop position.

2. The information viewing apparatus of claim 1, wherein, when determining that the predetermined dragging action, currently detected, is different from another dragging action for turning a page of the document, the processor makes the display section display the inputting screen in such a manner that the inputting screen overlaps the document.

3. The information viewing apparatus of claim 1, wherein the processor controls the display section so as to display the inputting screen at a position that is located on a side of the first touch position that is adjacent the stop touch position.

4. The information viewing apparatus of claim 1, further comprising:
  a storage section to store user's information in regard to the user, therein;
  wherein, based on the user's information stored in advance in the storage section, the processor specifies a dominant hand of the user who currently performs the predetermined dragging action, and controls the display section so as to display the inputting screen at a position that is located on a side of the dominant hand of the user adjacent the stop touch position.

5. The information viewing apparatus of claim 1, further comprising:
  a storage section to store user's information in regard to the user, therein;
  wherein, when making the inputting screen evacuate from the document, the processor makes the storage section store either information, inputted into the inputted screen, or other information, established by operating the inputted screen, therein.

6. The information viewing apparatus of claim 5, wherein, after making the inputting screen evacuate from the document, the processor controls the display section so as to display an icon for displaying the information or the other information onto the display section.

7. The information viewing apparatus of claim 1, wherein the inputting operation includes a movement across the inputting screen.

8. A non-transitory computer readable storage medium storing a computer executable program for implementing display controlling operations in an information viewing apparatus that includes a display section provided with a multi-touchable touch panel, the multi-touchable panel touch panel being mounted over a display surface and configured to simultaneously detect:
   a first touching operation performed by a user at a first touch position that is at a point of dragging origin located within a designating area at a periphery of a document display area in which a document is displayed, and
   a second touching operation performed by the user at a second touch position,
   wherein the first touch position is different than the second touch position, the computer executable program being executable by a processor to cause the computer executable program to perform a process comprising:
      displaying the document onto the display surface of the display section;
      making the display section display the designating area within the periphery of the document display area in which the document is displayed,
      detecting that a predetermined dragging action is the first touching operation at the first touch position by the user by dragging from the first touch position to a stop touch position;
      making the display section display an inputting screen in response to detection of the predetermined dragging action to conduct an inputting operation on the inputting screen as the second touching operation performed at the second touch position, the inputting screen displayed in such a manner that the inputting screen overlaps the document and is continuously displayed while the user maintains contact with the stop touch position; and
      controlling the information viewing apparatus display section so as to, when the user releases contact with the stop touch position which the user has kept touching after dragging from the first touch position to the stop touch position, make the inputting screen evacuate from the document when the user releases contact with the stop position.

9. The non-transitory computer readable storage medium of claim 8, wherein, when the predetermined dragging action, currently detected, is different from another dragging action for turning a page of the document, the display section is made to display the inputting screen in such a manner that the inputting screen overlaps the document.

10. The non-transitory computer readable storage medium of claim 8, wherein the display section is controlled so as to display the inputting screen at a position that is located on a side of the first position that is adjacent the stop touch position.

11. The non-transitory computer readable storage medium of claim 8, the process further comprising:
   storing user's information in regard to the user into a storage section;
   wherein, based on the user's information stored in advance in the storage section, a dominant hand of the user, who currently performs the predetermined dragging action, is specified, and the display section is controlled so as to display the inputting screen at a position that is located on a side of the dominant hand of the user adjacent the stop touch position.

12. The non-transitory computer readable storage medium of claim 8, the process further comprising:
   storing user's information in regard to the user into a storage section;
   wherein, when the inputting screen is made to evacuate from the document, either information inputted into the inputted screen, or other information established by operating the inputted screen, is stored into the storage section.

13. The non-transitory computer readable storage medium of claim 12, wherein, after the inputting screen is made to evacuate from the document, the display section is controlled so as to display an icon for displaying the information or the other information onto the display section.

14. The non-transitory computer readable storage medium of claim 8,
   wherein the inputting operation includes a movement across the inputting screen.

15. A controlling method to be employed in an information viewing apparatus, including a display section provided with a multi-touchable touch panel, the multi-touchable panel touch panel being mounted over a display surface and configured to simultaneously detect:
   a first touching operation performed by a user at a first touch position that is at a point of dragging origin located within a designating area at a periphery of a document display area in which a document is displayed, and
   a second touching operation performed by the user at a second touch position,
   wherein the first touch position is different than the second touch position, and the controlling method controlling a processor to control the display section based on signals outputted by the multi-touchable touch panel, the controlling method comprising:
      displaying the document onto the display surface of the display section;
      making the display section display the designating area within the periphery of the document display area in which the document is displayed,
      detecting that a predetermined dragging action on the touch panel at the first touch position from a point of dragging origin located within the designating area in the periphery of the document display area within which the document is displayed to a stop touch position by the user, wherein the predetermined dragging action is the first touching operation; and
      making the display section display an inputting screen in response to detection of the predetermined dragging action to conduct an inputting operation on the inputting screen as the second touching operation performed at the second touch position, the inputting screen displayed in such a manner that the inputting screen overlaps the document and is continuously displayed while the user maintains contact with the stop touch position; and
      controlling the information viewing apparatus display section so as to, when the user releases contact with the stop touch position which the user has kept touching after dragging from the first touch position to the stop touch position, make the inputting screen evacuate from the document when the user releases contact with the stop position.

16. The controlling method of claim 15, wherein, when the predetermined dragging action, currently detected, is different from another dragging action for turning a page of the document, the display section is made to display the inputting screen in such a manner that the inputting screen overlaps the document.

17. The controlling method of claim 15,
wherein the display section is controlled so as to display the inputting screen at a position that is located on a side of the first position that is adjacent the stop touch position.

18. The controlling method of claim 15, further comprising:
storing user's information in regard to the user into a storage section;
wherein, based on the user's information stored in advance in the storage section, a dominant hand of the user, who currently performs the predetermined dragging action, is specified, and the display section is controlled so as to display the inputting screen at a position that is located on a side of the dominant hand of the user adjacent the stop touch position.

19. The controlling method of claim 15, further comprising:
storing user's information in regard to the user into a storage section;
wherein, when the inputting screen is made to evacuate from the document, either information inputted into the inputted screen, or other information established by operating the inputted screen, is stored into the storage section.

20. The controlling method of claim 19,
wherein, after the inputting screen is made to evacuate from the document, the display section is controlled so as to display an icon for displaying the information or the other information onto the display section.

21. The controlling method of claim 19,
wherein the inputting operation includes a movement across the inputting screen.

\* \* \* \* \*